(12) United States Patent
Sneed

(10) Patent No.: US 6,196,356 B1
(45) Date of Patent: Mar. 6, 2001

(54) METHOD AND APPARATUS FOR INSTALLING ELEVATOR CAR AND COUNTERWEIGHT GUIDE RAILS

(76) Inventor: Terryle L. Sneed, 430 W. Foothill Blvd., LaCañada, CA (US) 91011

( * ) Notice: Subject to any disclaimer, the term of this patent is extended or adjusted under 35 U.S.C. 154(b) by 0 days.

(21) Appl. No.: 09/382,266

(22) Filed: Aug. 24, 1999

(51) Int. Cl.[7] ................................ B66B 7/02; E04B 1/38
(52) U.S. Cl. ............................................. 187/408; 403/14
(58) Field of Search ................................... 187/408, 406, 187/414; 403/13, 14

(56) References Cited

U.S. PATENT DOCUMENTS

| | | | |
|---|---|---|---|
| 2,990,920 | * | 7/1961 | Hoffman, Jr. ........................ 52/633 |
| 3,420,337 | * | 1/1969 | Magee ................................ 187/408 |
| 3,842,554 | * | 10/1974 | Swick ................................. 52/235 |
| 3,948,358 | * | 4/1976 | Atkey ................................. 187/408 |
| 4,035,093 | * | 7/1977 | Redshaw ............................. 403/4 |
| 4,461,593 | * | 7/1984 | Rodseth ............................. 403/14 |
| 5,513,476 | * | 5/1996 | Jones ................................ 52/713 |
| 5,611,179 | * | 3/1997 | Leek ................................. 52/393.3 |

FOREIGN PATENT DOCUMENTS

| | | | |
|---|---|---|---|
| 404213582 | * | 8/1992 | (JP) ................................. 187/408 |
| 405254756 | * | 10/1993 | (JP) ................................. 187/408 |
| 1744028 | * | 6/1992 | (SU) ................................. 187/406 |
| 988733 | * | 10/1993 | (SU) ................................. 187/408 |

* cited by examiner

Primary Examiner—Robert P. Olszewski
Assistant Examiner—Paul T. Chin
(74) Attorney, Agent, or Firm—James E. Brunton

(57) ABSTRACT

A method and apparatus for installing elevator car and counterweight guide rails within an elevator hoistway of a building that requires no welding operations to be performed in order to connect the brackets together. The connector brackets of the invention include cooperating support and connector brackets each having a plurality of strategically arranged, indexable connector holes that permit the necessary degree of adjustment of the brackets to properly position the guide rails within the hoistway. Specially configured connector bolts are provided which impart substantial structural integrity to the interconnected bracket and positively preclude shifting of the interconnected brackets even as a result of projected seismic loading.

19 Claims, 15 Drawing Sheets

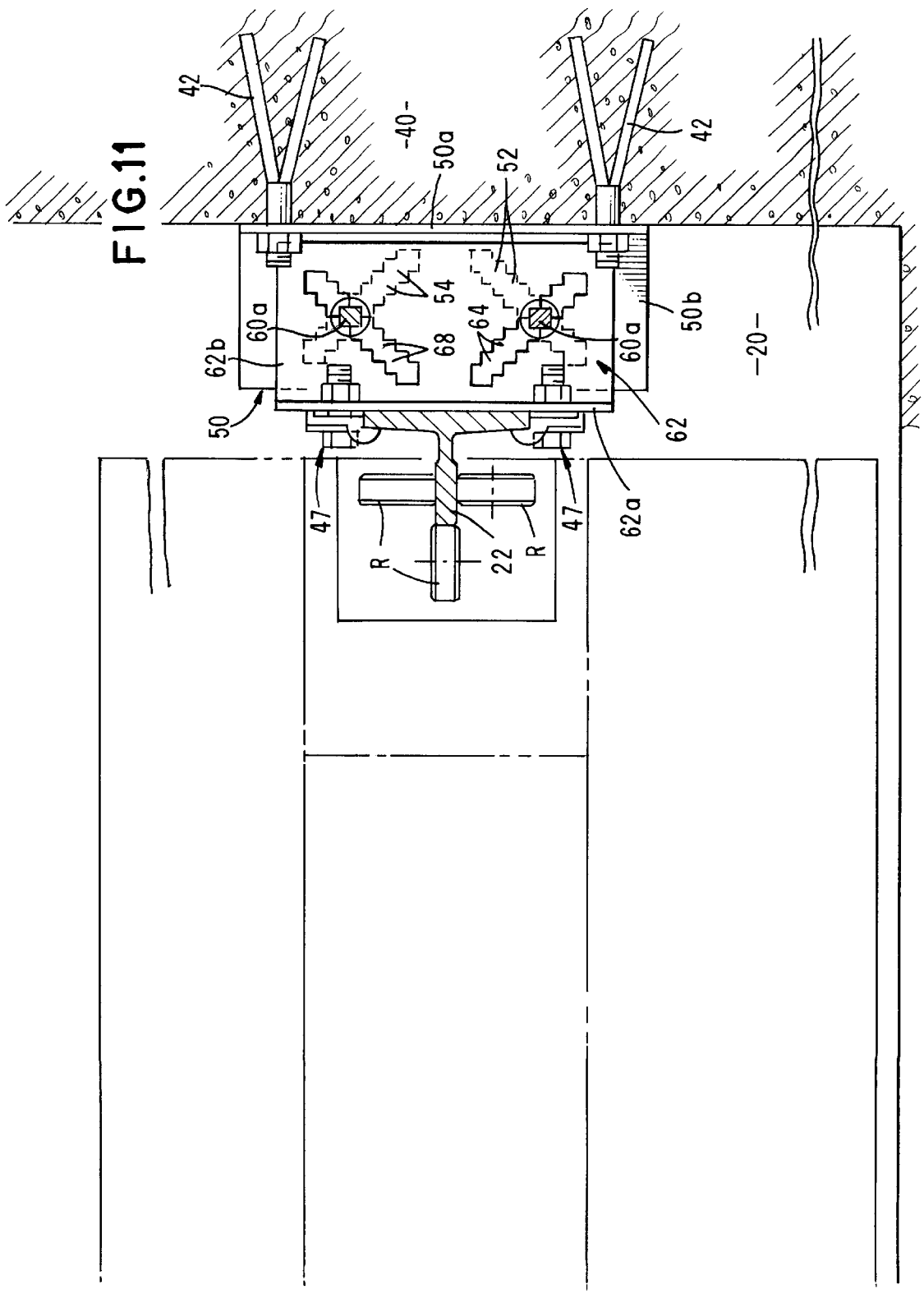

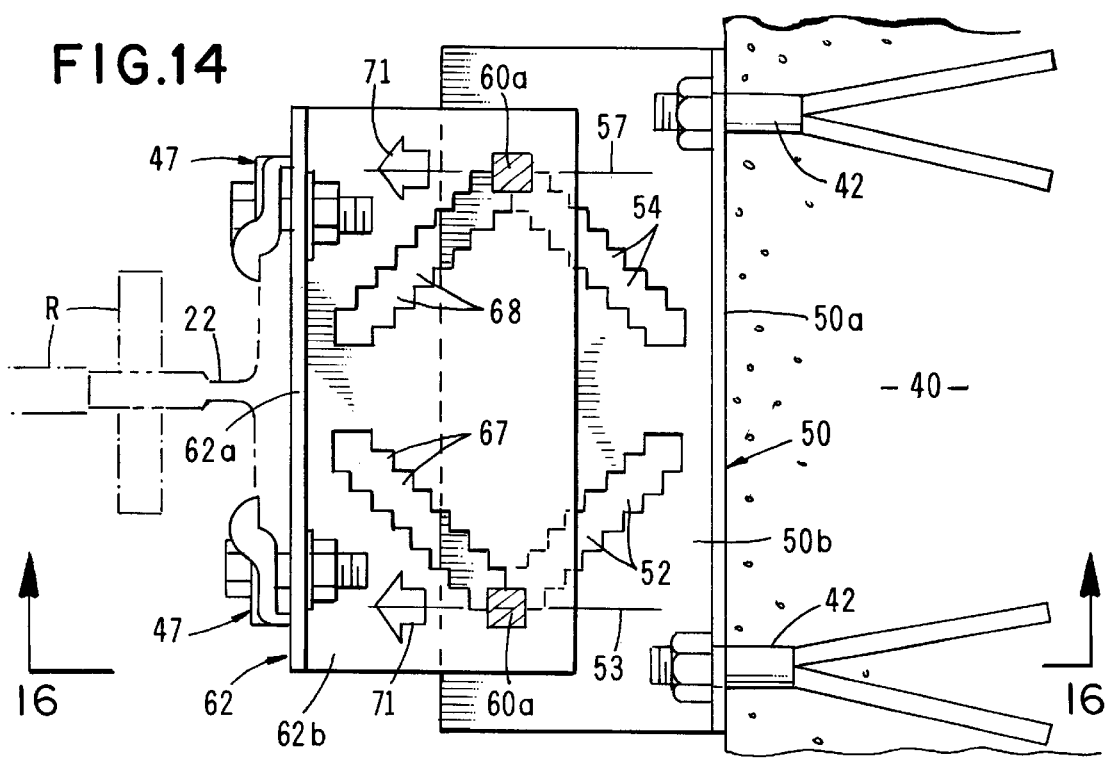
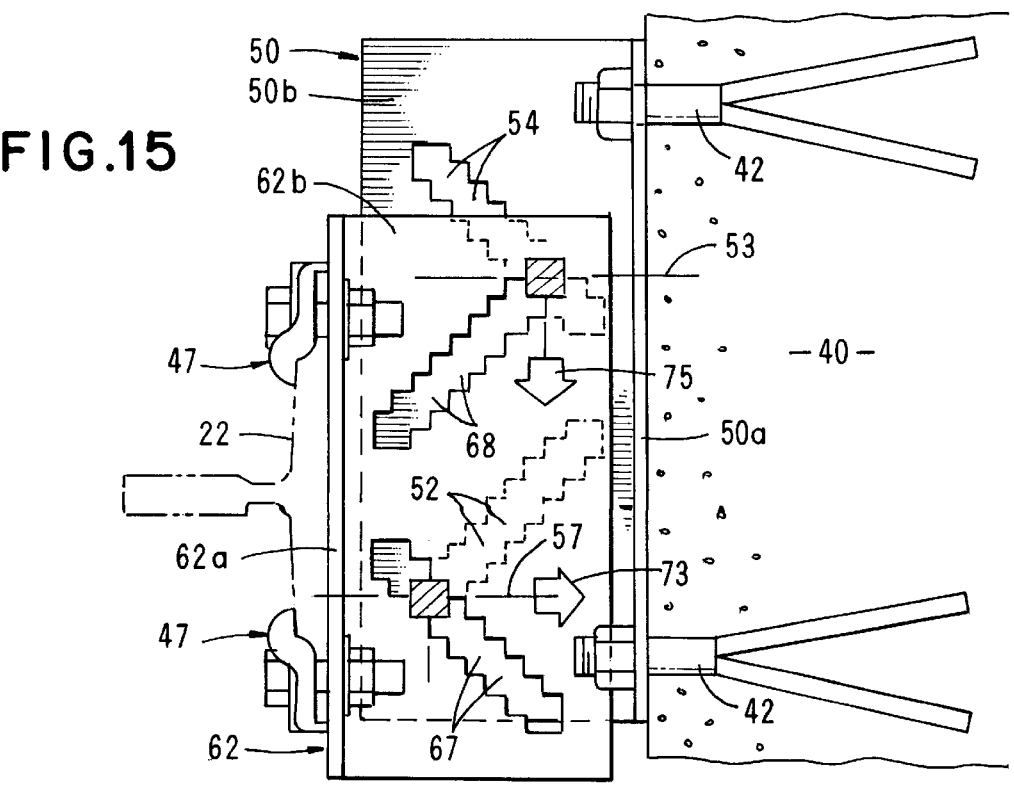

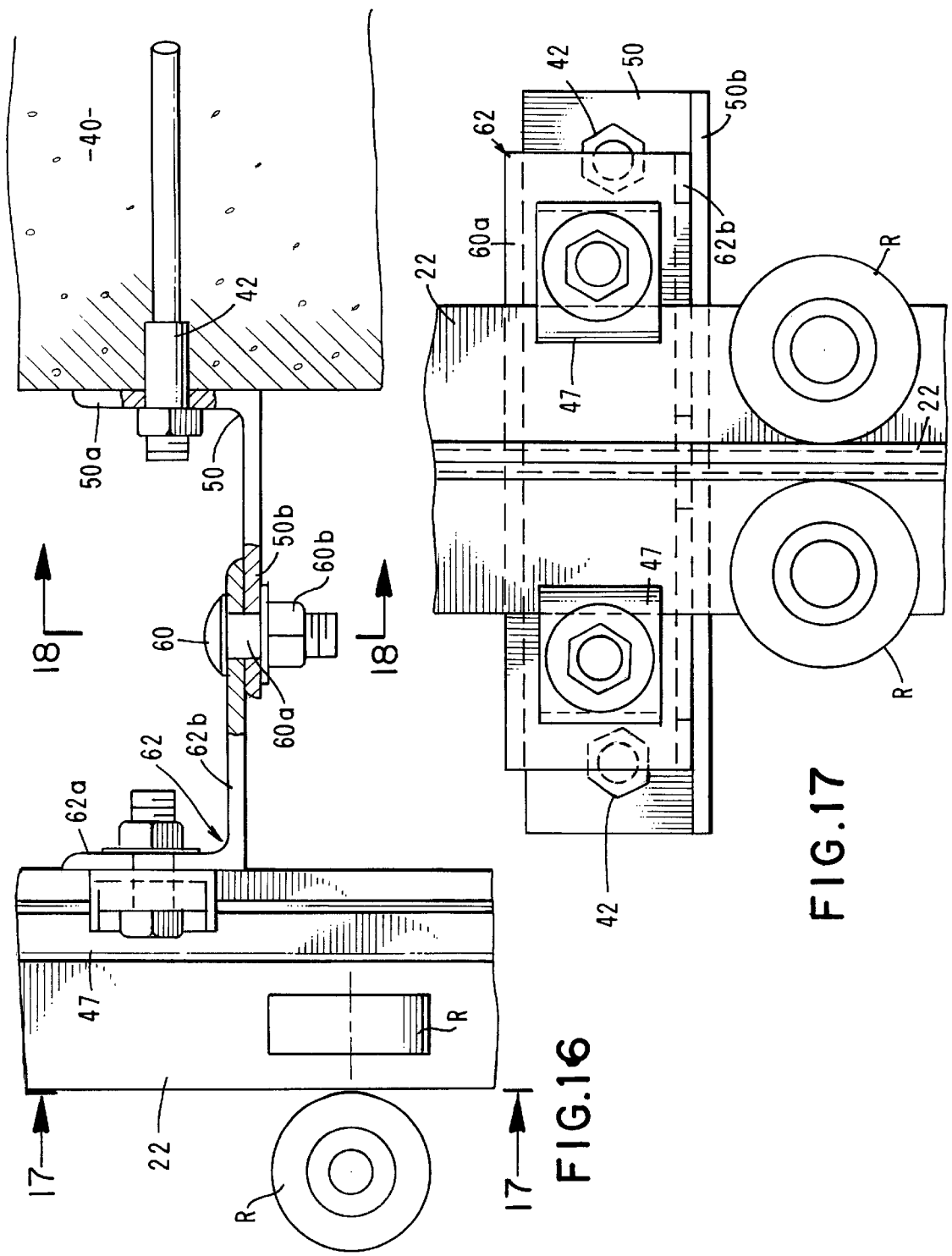

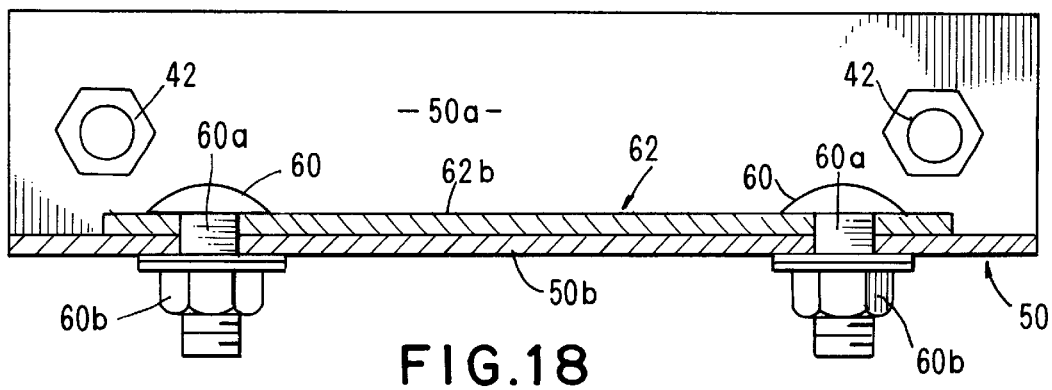
FIG.18
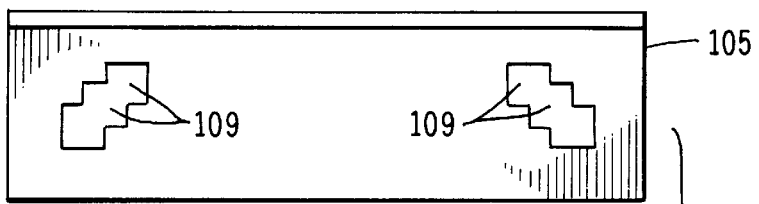
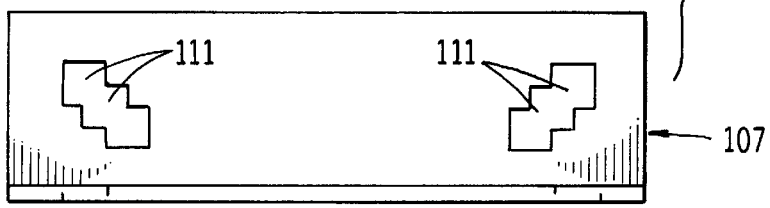
FIG.19
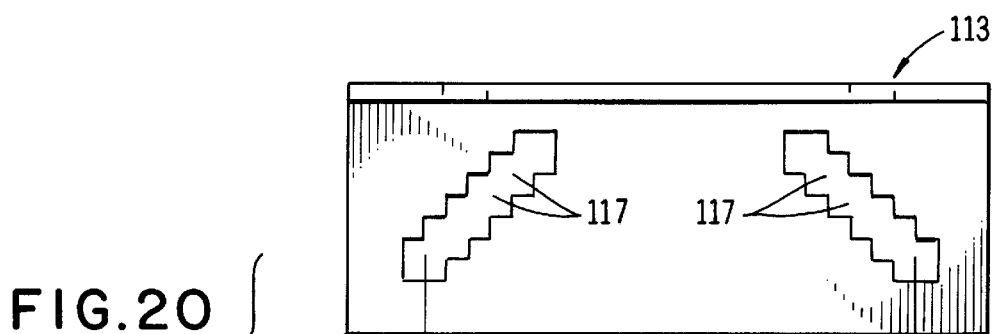
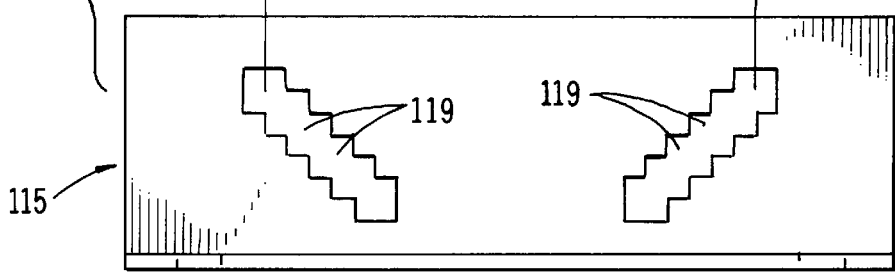
FIG.20

METHOD AND APPARATUS FOR INSTALLING ELEVATOR CAR AND COUNTERWEIGHT GUIDE RAILS

BACKGROUND OF THE INVENTION

1. Field of the Invention

The present invention relates generally to elevator systems. More particularly, the invention concerns novel connector brackets and the method of using the same for installing elevator car and counterweight guide rails within an elevator shaft.

2. Discussion of the Prior Art

A typical prior art electric power elevator system has an elevator shaft or hoistway within which guide rails are mounted to guide the vertical travel of elevator cars and counterweights. As a general rule, two elevator car guide rails and two counterweight guide rails are affixed to the building structure at spaced-apart locations.

In a typical prior art construction, a plurality of first support right angle brackets are connected at vertically spaced locations to the walls of the building structure that form the elevator shaft. By way of example, when poured concrete walls define the hoistway of the building structure, anchor bolts or like connectors are used to securely affix the first legs of each of the first brackets to the concrete walls. When steel beams define the hoistway of the building structure, the first leg of each of the brackets is generally welded to the steel beams at selected, spaced-apart locations. To position the car rails and counterweight rails within the hoistway, the outwardly protruding second legs of the first and second brackets are first clamped together in proper alignment and then are permanently connected together by welding. When the distance between the walls that define the hoistway and the guide rails is substantial, spanner plates are typically used to span and connect together the second legs of the first and second right angle brackets. When the car guide rails and the counterweight guide rails are correctly positioned within the hoistway of the building, conventional roller assemblies mounted on the cars and on the counterweight assemblies travel along the guide rails to guide the vertical travel of the cars and counterweight assemblies within the hoistway.

Similar constructions are employed in typical prior art hydraulic power elevator systems. However, in such systems, counterweights are not used and, therefore, only elevator car guide rails need to be installed within the building hoistway. The elevator car guide rails of the hydraulic systems are usually quite similar to those used in electric power systems and are typically installed in a similar manner.

In accordance with typical prior art installation procedures, a plumb line is first established within the hoistway along a vertical line that is intended to locate the faces of the second guide rail right angle brackets to which the guide rail is to be connected. Because of the vagaries of building construction, the brackets typically do not initially align with the plumb line and often considerable adjustment is required prior to finally permanently interconnecting the guide rail brackets with the support brackets that are affixed to the walls of to hoistway. As a general rule, in initially positioning the guide rails within the hoistway, the guide rail or second angle brackets must be moved within a generally horizontal plane toward and away from and also from side to side relative to the support brackets. After the rail brackets are appropriately positioned relative to the support brackets they are temporarily connected to the support brackets by suitable clamps. With the brackets thusly clamped together, they are permanently connected by welding the horizontally extending legs of the rail brackets to the horizontally extending legs of the support brackets. This done, the elevator car roller assemblies and the counterweight roller assemblies are operably interconnected with their respective guide rails.

The prior art installation methods described in the preceding paragraph are cumbersome and time consuming even in new construction. However, in retrofit constructions, the procedures are particularly difficult. For example, when the elevator systems in hospitals, schools, and other public buildings are retrofitted, the welding step is quite hazardous and most undesirable. This is because, during the retrofit operations, welding of the rail brackets to the support brackets results in noxious welding gases and fumes unavoidably spreading throughout the building. Particularly in hospitals and schools, these noxious welding gases can be both unpleasant and hazardous and can, on occasion, result in serious complications to the persons exposed to the noxious fumes.

It is this major drawback of the prior art processes that the present invention seeks to avoid by providing uniquely configured, readily adjustable support and guide rail brackets that can be safely and securely interconnected together by special bolts rather than by welding. As will be better understood from the description which follows, the connector legs of the support and guide rail brackets of the present invention are provided with a plurality of strategically arranged, indexable connector holes that permit the necessary degree of adjustment of the brackets to properly position the guide rails within the hoistway. When selected pairs of connector holes provided in the brackets are appropriately aligned, the brackets can be securely bolted together using specially configured bolts that provide substantial structural integrity and positively preclude shifting of the brackets even as a result of projected seismic loading.

SUMMARY OF THE INVENTION

It is an object of the present invention to provide novel connector brackets and the method of using the same for quickly, easily, and accurately for installing elevator car and counterweight guide rails within an elevator hoistway of a building.

Another object of the invention is to provide a method of the aforementioned character which requires no welding operations to be performed in order to connect the brackets together.

Another object of the invention is to provide connector brackets of the character described which include cooperating support and connector brackets each having a plurality of strategically arranged, indexable connector holes that permit the necessary degree of adjustment of the brackets to properly position the guide rails within the hoistway.

Another object of the invention is to provide an apparatus as described in the preceding paragraphs that includes specially configured connector bolts that provide substantial structural integrity and positively preclude shifting of the brackets even as a result of projected seismic loading.

DESCRIPTION OF THE DRAWINGS

FIGS. 10 and 11, when considered together, comprise a top view, partly in cross section of the installation of the elevator car guide rails within the elevator shaft.

FIG. 14 is a top plan view similar to FIG. 11 illustrating the sliding movement of the second elevator car bracket relative to the first elevator car bracket in a direction perpendicular to structural wall 40 to indexably align selected through holes in the brackets.

FIG. 15 is a top plan view similar to FIG. 14, but illustrating the sliding movement of the second elevator car bracket relative to the first elevator car bracket in a transverse direction to indexably align selected through holes in the brackets.

FIG. 16 is a view taken along lines 16—16 of FIG. 14.

FIG. 17 is a cross-sectional view taken along lines 17—17 of FIG. 16.

FIG. 18 is a view taken along lines 18—18 of FIG. 16.

FIG. 19 is a top plan view of an alternate form of the support and connector brackets of the invention.

FIG. 20 is a top plan view of still another form of the support and connector brackets of the invention.

DESCRIPTION OF THE INVENTION

Figure 1:
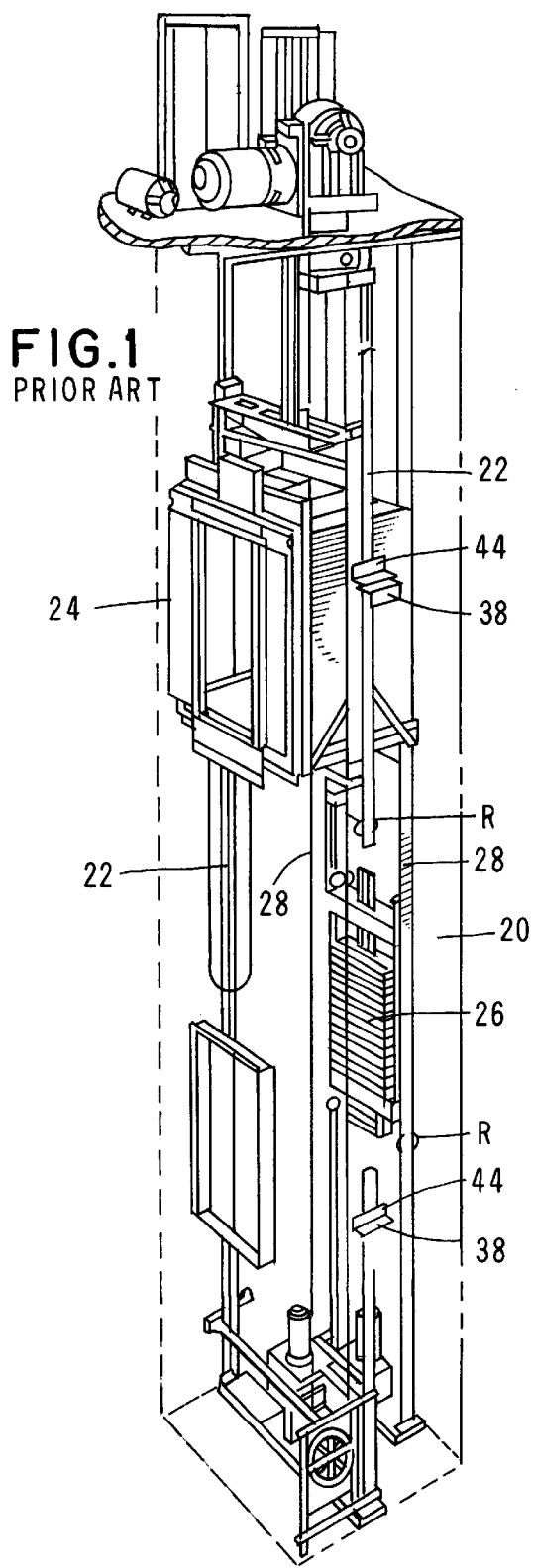
FIG. 1 is a generally perspective, illustrative view of a typical prior art electric power elevator system.
Figure 1A:
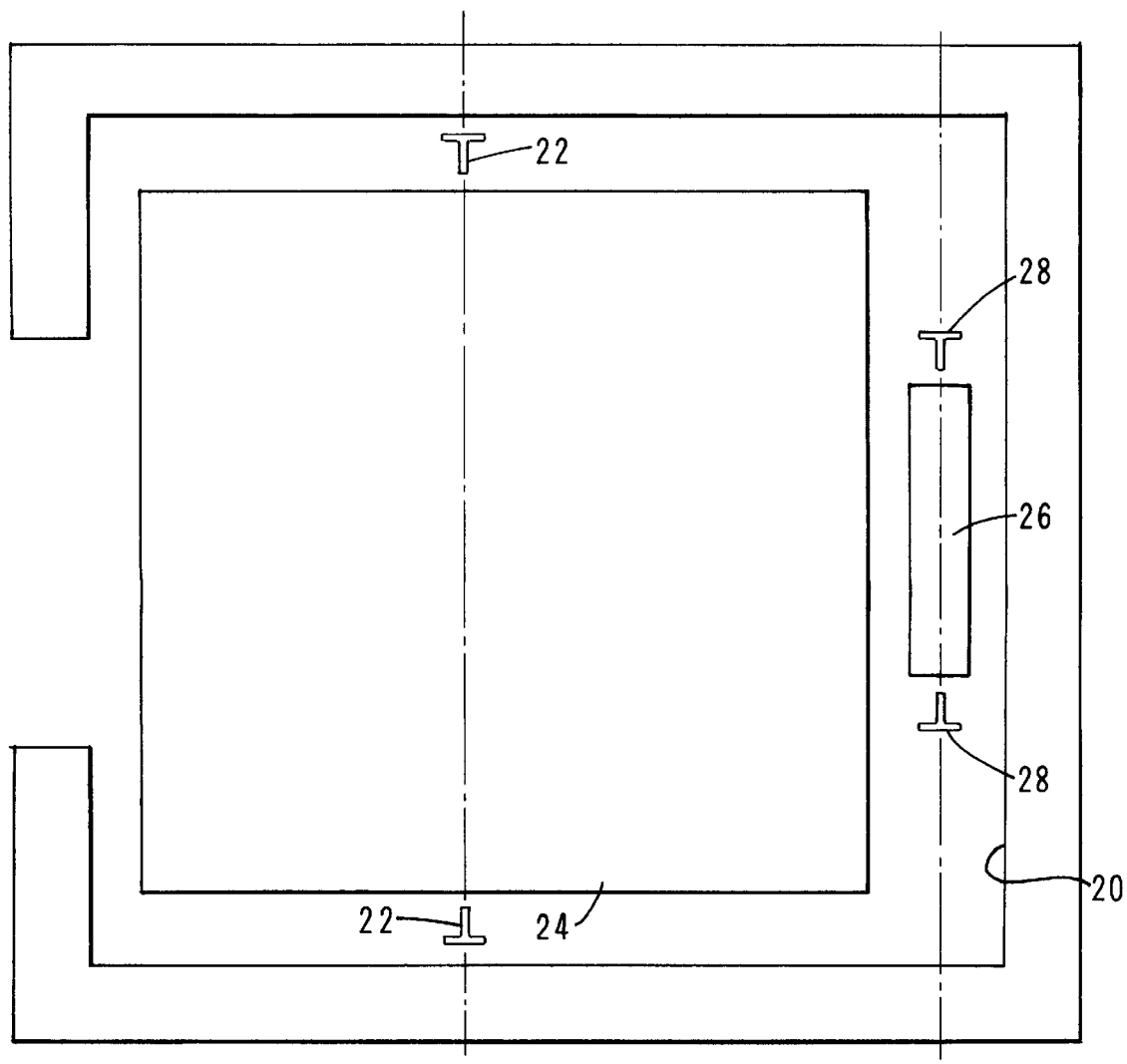
FIG. 1A is a top plan view of a typical prior art electric power elevator system showing the elevator car, the counterweights and the guide rails positioned within the elevator hoistway.

Referring to the drawings and particularly to FIGS. 1 and 1A, one form of a typical prior art electric-power elevator system is there shown. The elevator system is shown installed within an elevator shaft or a hoistway 20 that is defined by four spaced-apart concrete sidewalls. Reciprocally movable along spaced-apart guide rails 22 is an elevator car 24. Also mounted within shaft 20 is a conventional counterweight system which is made up of a plurality of counterweights 26 that are reciprocally movable within shaft 20 along a pair of spaced-apart guide rails 28.

Figure 2:
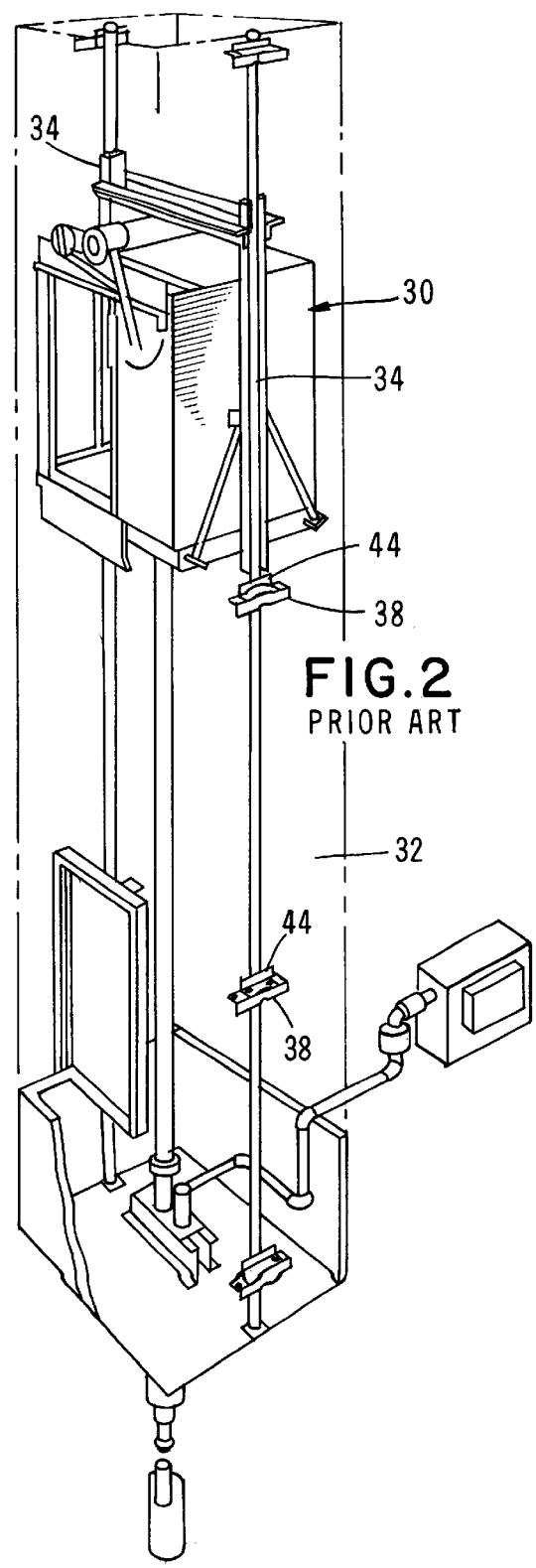
FIG. 2 is a generally perspective, illustrative view of a typical prior art hydraulic elevator system.

FIG. 2 illustrates a typical prior art hydraulically operated elevator system. The hydraulically operated elevator system also comprises an elevator car 30 that is reciprocally movable within an elevator shaft or hoistway 32. As in the electric power elevator system, car 30 moves along a pair of spaced-apart guide rails 34 that are attached to the side walls of the building structure that defines elevator shaft 32. The guide rails 34 are of similar construction and operation to guide rails 22.

Figure 3:
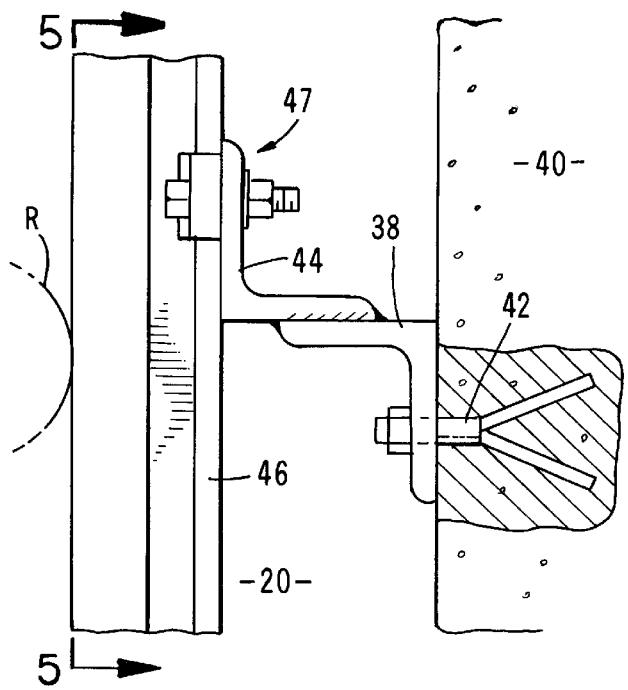
FIG. 3 is a greatly enlarged, side-elevational view, partly in cross section showing the prior art welded connection of a support bracket and a connector bracket of the character generally used to suitably mount the elevator car rails in a prior art elevator system.
Figure 4:
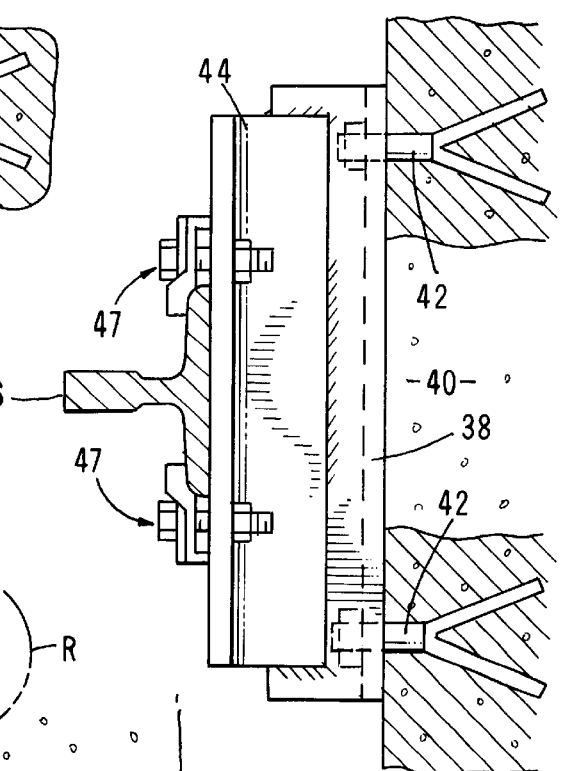
FIG. 4 is a top view, partly in cross section of the prior art welded connection shown in FIG. 3.
Figure 5:
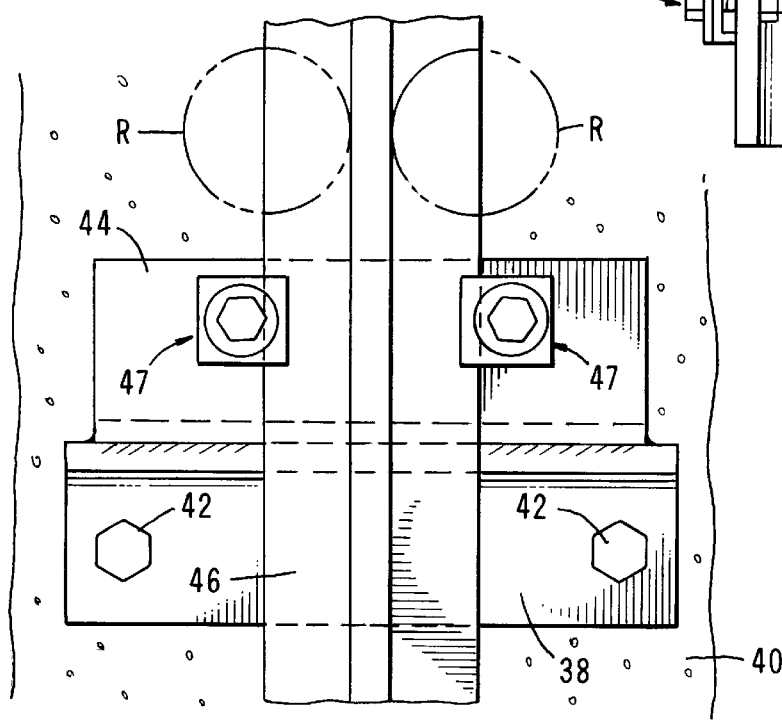
FIG. 5 is a view taken along lines 5—5 of FIG. 3.

Referring particularly to FIGS. 1 and 3, it can be seen that in a typical prior art electric power elevator system a plurality of first support brackets 38 are connected at vertically spaced locations to the concrete walls 40 (FIG. 3) that define the hoistway or elevator shaft 20. As best seen by referring to FIG. 3, the support brackets 38, which are connected to the concrete walls by suitable concrete connectors 42, comprise angle iron or steel brackets of the right angle configuration shown in FIGS. 3, 4, and 5. Connected to brackets 38 as by welding are a plurality of vertically spaced-apart support brackets 44 to which guide rails 46 are suitably interconnected in the manner shown in FIGS. 3, 4, and 5. Brackets 44, which are right angle iron or steel brackets are interconnected with guide rails 46 by bolt connector devices generally designated in the drawings by the numeral 47. As depicted in FIGS. 1, 3, and 5, the elevator car apparatus includes spaced-apart rollers "R" which are positioned to roll along rails 46 and guide the travel of the elevator car 24 upwardly and downwardly within the elevator shaft. As illustrated in FIG. 2, brackets 38 and 44, that are provided in the hydraulically operated system there shown, are of similar construction and operation to those illustrated in FIGS. 3 through 5.

In the prior art, connector systems of the character illustrated in FIGS. 1 through 5 are typically used in the installation and retrofit of elevator car and counterweight guide rails. As previously mentioned, when retrofit operations take place in schools, hospitals, and like facilities, the exposure of individuals within these facilities to noxious welding gases and fumes is highly undesirable and can be detrimental to the health of the individuals. For this reason, the inventor named herein has devised a new a novel method and apparatus for installing elevator car and counterweight guide rails that eliminates the need for welding while at the same time providing a structural system that has overall structural integrity equal to or better than the prior art welded systems.

Figure 6:
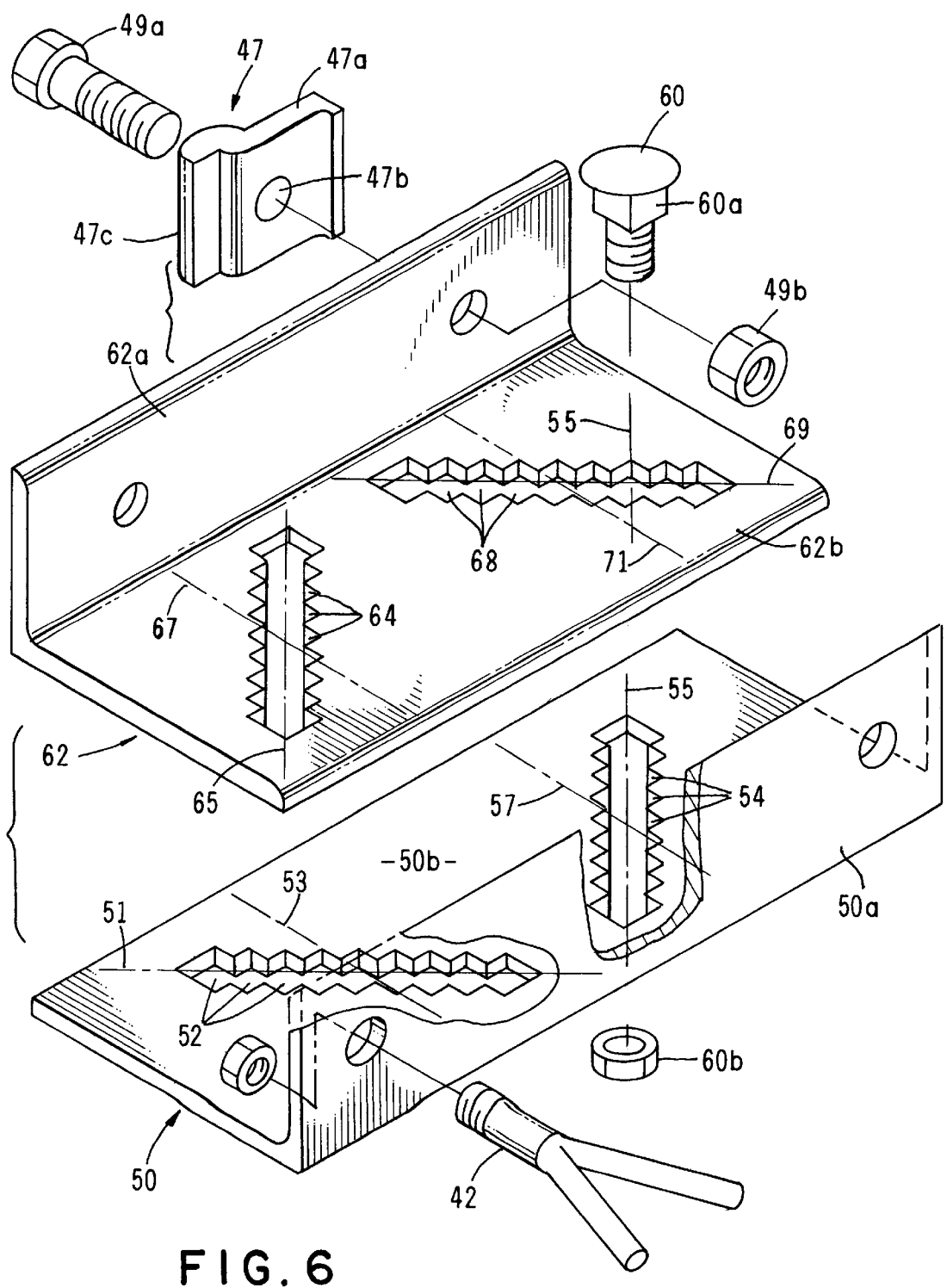
FIG. 6 is a greatly enlarged, generally perspective, exploded view of one form of the novel connector apparatus of the present invention for interconnecting an elevator car guide rail to the building structure that defines the elevator shaft.

Turning next to FIG. 6, there is shown one form of the novel connector and support brackets of the present invention for interconnecting a structural component, such as an elevator car with a supporting structure, such as the building structure defining the elevator hoistway. The support, or first bracket, here comprises a right angle bracket 50 having a first generally planar, vertically extending leg 50a which is adapted to be connected to the supporting structure such as concrete walls 40 (FIGS. 3 and 4) by means of suitable connectors 42. First bracket 50 also includes a second, generally planar leg 50b that extends substantially perpendicularly outwardly from leg 50a in the manner indicated in FIG. 6. Second leg 50b is provided with a plurality of first angularly extending through holes 52 that are disposed along a line 51. As illustrated in the lower portion of FIG. 6, line 51 extends at an acute angle with respect to a first reference line 53 that extends generally perpendicularly outwardly from first leg 50a. Second leg 50b of the bracket 50 is also provided with a plurality of angularly extending second through holes 54 that positioned along a line 55. Line 55 extends at an acute angle with respect to a second reference line 57 that extends generally perpendicularly outward from leg 50a. Each of the through holes 52 and 54 formed in leg 50b of first bracket 50 are generally rectangular in plan and are of a size and shape to closely receive the square shank portion 60a of threaded connector bolts 60 which, in a manner presently to be described, are used to interconnect first support bracket 50 with a second connector bracket 62.

Second, connector bracket 62 includes a generally planar leg 62a that is connected by suitable connectors to the structural component which, in this case, comprises a guide rail that is of similar construction to the previously described prior art guide rail 22 (FIG. 1). Second bracket 62 also includes a generally planar second leg 62b that extends generally perpendicularly outward from leg 62a in the manner shown in FIG. 6. In a manner presently to be described, during the installation step, planar leg 62b is slidably movable relative to second leg 50b of first support bracket 50 between first and second positions. As indicated in FIG. 6, second leg 62b of connector bracket 62 includes a plurality of third, generally rectangularly shaped through holes 64, which are positioned along a line 65. As indicated by the upper portion of FIG. 6, line 65 extends at an acute angle with respect to a reference line 67 that extends generally perpendicularly outward from first leg 62a of second connector bracket 62. Leg 62b of second connector bracket 62 is also provided with a plurality of generally rectangularly shaped through holes 68 which are positioned along a line 69. Line 69 extends at an acute angle from a reference line 71 that extends generally perpendicularly outward from leg 62a of connector bracket 62.

Through holes 52 are so constructed and arranged that a selected one of the second through holes 64 formed in bracket 62 can be moved into index with a selected one of the through holes 52 by a sliding movement of bracket 62 relative to bracket 50. Similarly, through holes 54 are constructed and arranged so that a selected one of the fourth through holes 68 formed in bracket 62 can be moved into index with a selected one of the through holes 54 when the second leg 62b of second bracket 62 is moved from a first position to a second position relative to bracket 50. As will be discussed in greater detail in the paragraphs which follow, bracket 62 can be slidably moved relative to bracket 50 in a first direction generally parallel with reference lines 53 and 57 (see FIG. 14) or, alternatively, can be slidably moved in a transverse direction generally perpendicular to reference lines 53 and 57 (see FIG. 15). Because of the unique positioning of the first and second sets of through holes in each of the brackets 50 and 62, a selected two of the through holes of the first and second sets of bracket 62 can be indexably aligned with a selected two of the through holes of bracket 50 by a sliding movement of bracket 62 relative to bracket 50 either inwardly and outwardly or in a transverse direction from a first position to a second position (see FIGS. 10, 11, 14, and 15).

When the second connector bracket 62 is correctly aligned with support bracket 50 and a selected one of the though holes 64 is indexably aligned with a selected one of the through holes 52, a first bolt, such as a bolt 60, can be introduced into the aligned through holes. Similarly, when the second connector bracket 62 is correctly aligned with support bracket 50 and a selected one of the through holes 68 is indexably aligned with a selected one of the through holes 54, a second bolt, such as a bolt 60, can be introduced into the aligned through holes. With the bolts 60 in position with the square shank portions thereof closely received within the aligned holes, nuts such as nut 60b can be used to securely interconnect connector bracket 62 with support bracket 50 in the manner shown in FIGS. 16 and 18. When the brackets are thusly connected, the square shaped shank portions 60a of the bolts 60 will be snugly received within the indexably aligned through holes in the two brackets and will efficiently prevent sliding movement between the brackets even under severe seismic loading (see FIGS. 16 and 18).

Considering next the method of the invention for interconnecting a guide rail of an elevator system with a structure defining a hoistway within which the elevator travels, one form of the method of the invention comprises the following steps: First, a plurality of elevator car support brackets such as brackets 50 are affixed to the walls 40 that define the hoistway (see FIGS. 1 and 14). This done, the correct plumb line location of the elevator car rails within the hoistway is determined by establishing a plumb line within the hoistway in accordance with well known procedures. With the plumb line established and with the support brackets appropriately affixed to the walls of the hoistway, the next step in the method of the invention is to move the second leg 62b of the second bracket, such as bracket 62, into engagement with the second leg 50b of a bracket such as bracket 50. The second bracket is then moved in the directions indicated by the arrows 71 in FIG. 14 to bring the second bracket into correct position with respect to the plumb line and, at the same time, to indexably align a selected one of screw holes 68 with a selected one of screw holes 54 formed in bracket 50. Additionally, as the second bracket is moved either toward or away from wall 40, a selected one of the screw holes 67 in the second bracket will indexably align with a selected one of the holes 52 formed in the first bracket 50. In certain instances, in order to properly align the brackets, bracket 62 must be moved both inwardly and outwardly and transversely relative to bracket 50 as indicated in FIG. 15 by the arrows 73 and 75. In this instance a different through hole 68 will be aligned with a different through hole 54 and a different through hole 67 will be aligned with a different through hole 52 in the manner shown in FIG. 15. Once the proper through holes have been aligned in the manner shown in FIG. 15, a first bolt 60 is inserted into the aligned through holes 68 and 54 so that rectangular shank 60a is closely received within the indexed holes and a second bolt 60 is inserted into indexed screw holes 67 and 52 in the manner shown in FIG. 14. The bolts 60 are then appropriately cinched down using nuts 60b.

Figure 10:
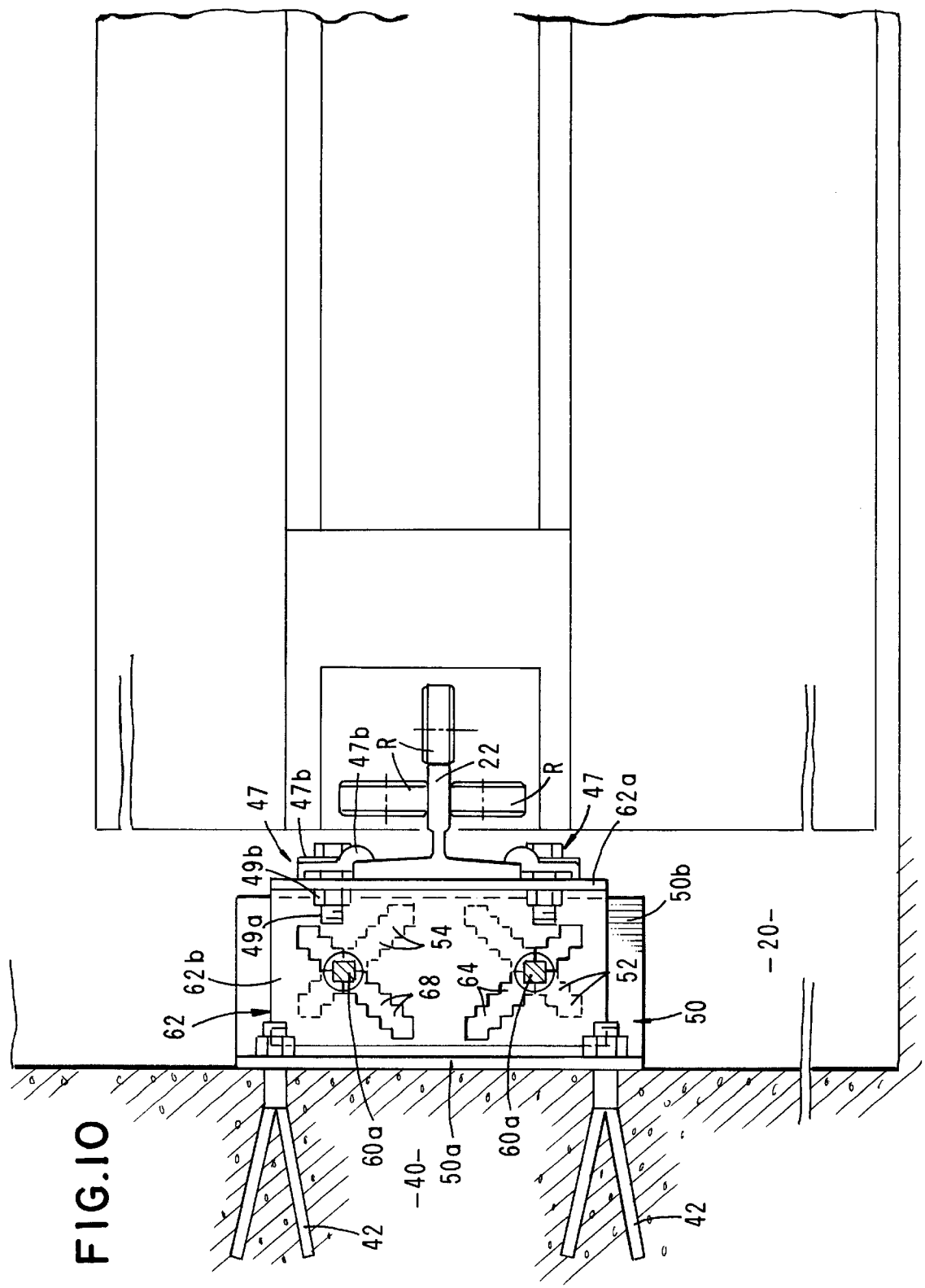

In the manner illustrated in FIGS. 10 and 11, once second bracket 62 is securely affixed to bracket 50 and is in a proper position relative to the previously established plumb line, the elevator car guide rail can be affixed to second bracket 62 through use of the previously identified rail connector means or connector assemblies 47. Referring particularly to FIGS. 6 and 10, each connector assembly 47 can be seen to comprise a clamping member 47a (FIG. 6) having a bolt receiving bore 47b and a hook-like end portion 47c. End portions 47c of the clamping members grippingly engage the flange portions of the guide rails 22 and are secured thereto by threaded bolts and nuts 49a and 49b respectively (FIG. 6).

Figure 7:
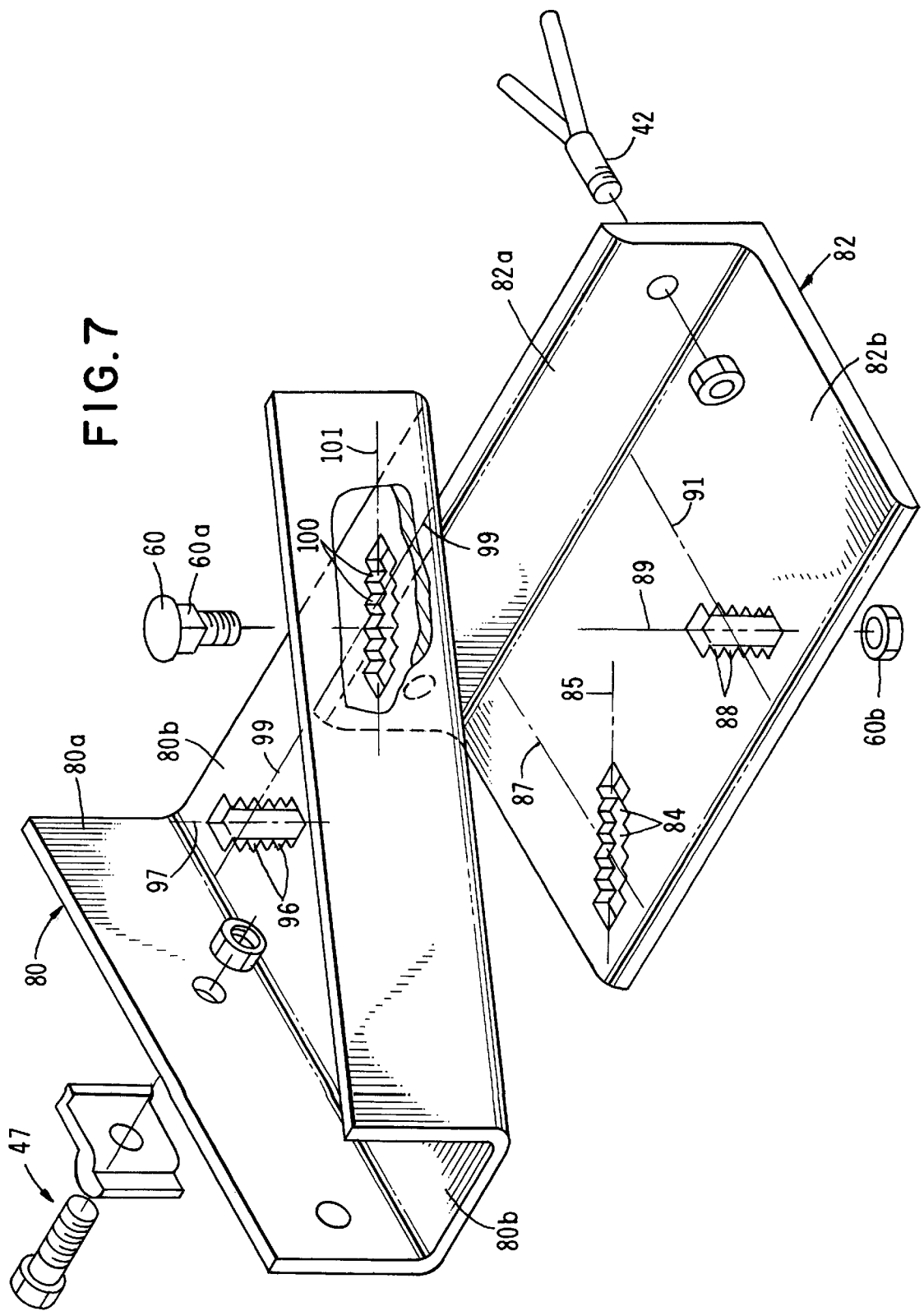
FIG. 7 is a greatly enlarged, generally perspective, exploded view of an alternative form of a connector apparatus of the present invention for interconnecting counterweight guide rails to the building structure that defines the elevator shaft.

Turning now to FIG. 7, one form of the connector and support brackets of the invention for use in installing the counterweights of the electric powered elevator systems is there illustrated. These brackets are somewhat similar to the earlier described brackets, but the connector bracket 80 is generally triangular shaped in plan. The support bracket comprises a right angle bracket 82 having a first generally planar, vertically extending leg 82*a* which is adapted to be connected to the supporting structure such as concrete walls 40 (FIGS. 8 and 9) by means of suitable connectors 42. Bracket 82 also includes a second, generally planar leg 82*b* that extends substantially perpendicularly outwardly from leg 82*a* in the manner indicated in FIG. 7. Second leg 82*b* is provided with a plurality of first angularly extending through holes 84 that are disposed along a line 85. As illustrated in the lower portion of FIG. 7, line 85 extends at an acute angle with respect to a first reference line 87 that extends generally perpendicularly outwardly from first leg 82*a*. Second leg 82*b* of the bracket 82 is also provided with a plurality of angularly extending second through holes 88 that extend along a line 89. Line 89 extends at an acute angle with respect to a second reference line 91 that extends generally perpendicularly outward from leg 82*a*. Each of the though holes 84 and 88 formed in leg 82*b* of first bracket 82 are generally rectangular in plan and are of a size and shape to closely receive the square shank portion 60*a* of threaded connector bolts 60 which are used to interconnect support bracket 82 with connector bracket 80.

Figure 8:
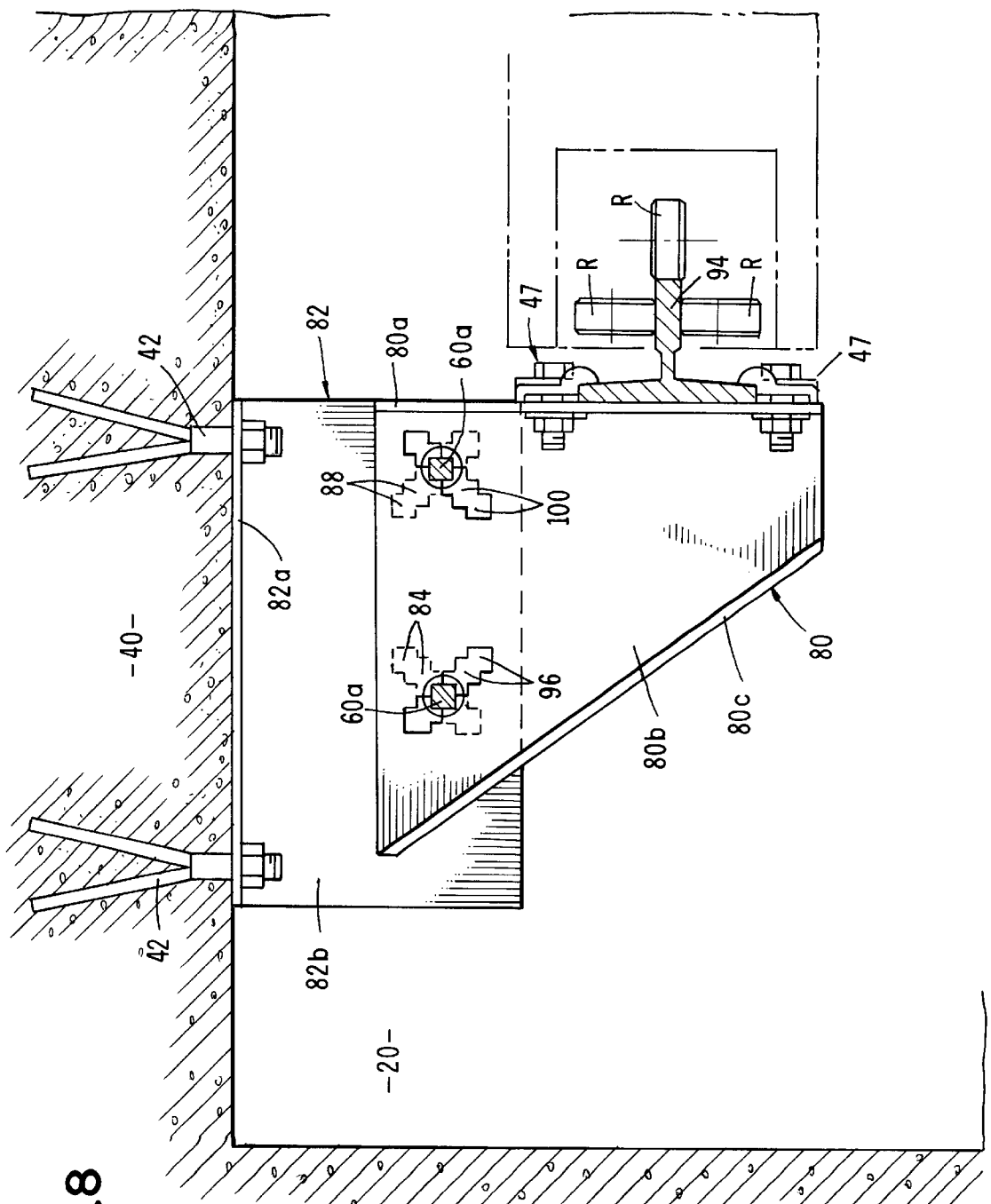
FIGS. 8 and 9, when considered together, comprise a top view, partly in cross section, of the installation of the counterweight guide rails within the elevator shaft.
Figure 9:
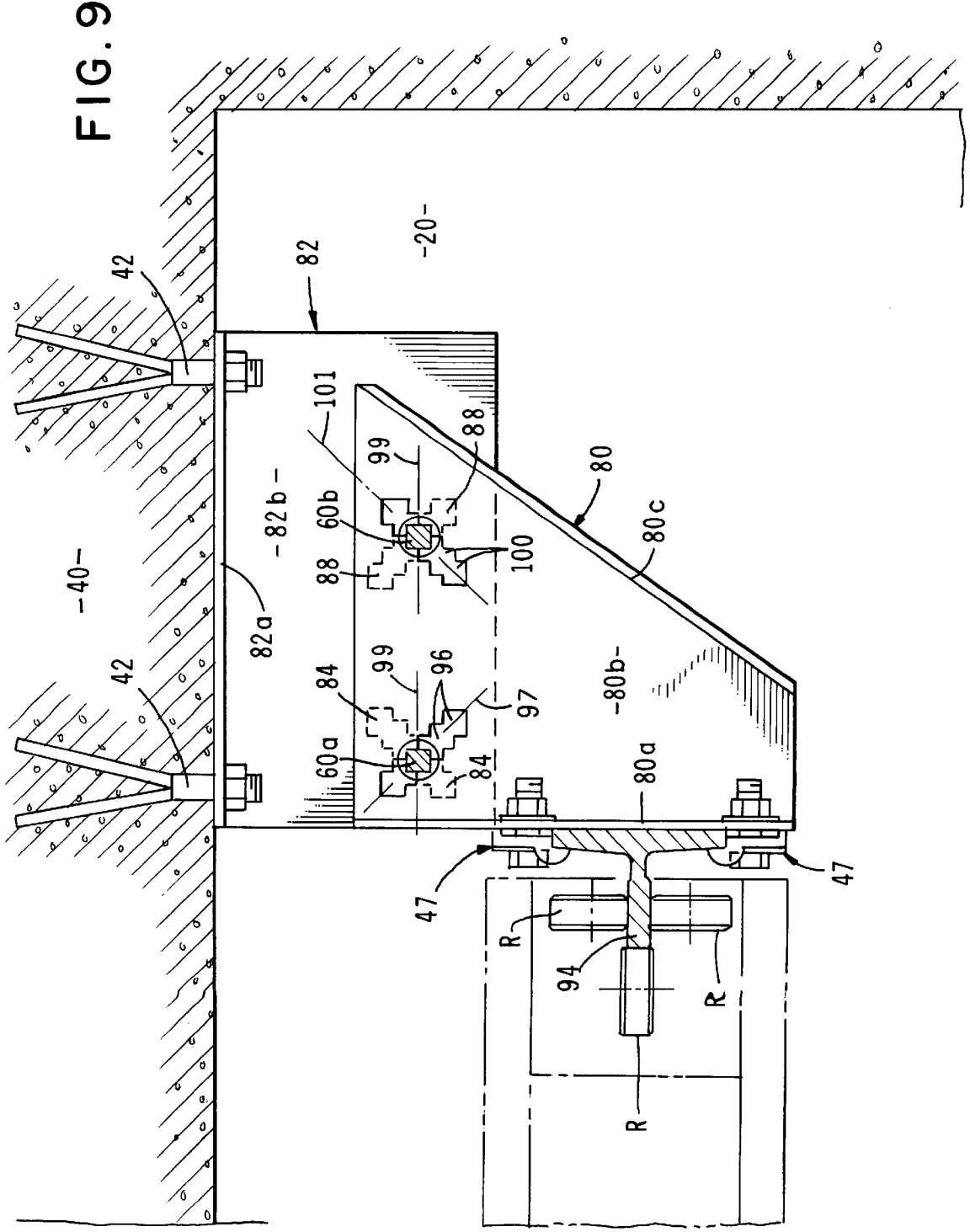

Connector bracket 80 includes a first generally planar leg 80*a* that is connected by suitable connectors to the structural component which, in this case, comprises a counterweight guide rail 94 that is of similar construction to the previously described prior art guide rail 22 (FIG. 1). Connector bracket 80 also includes a generally planar leg 80*b* that extends generally perpendicularly outward from leg 80*a* in the manner shown in FIG. 7 and further includes an upright flange portion 80*c*. In a manner presently to be described, during the installation step, planar leg 80*b* is slidably movable relative to leg 82*b* of support bracket 82 between first and second positions. As indicated in FIGS. 7, 8, and 9 leg 80*b* of connector bracket 80 includes a plurality of third, generally rectangularly shaped through holes 96, which are positioned along a line 97. As indicated by the upper portion of FIG. 7, line 97 extends at an acute angle with respect to a reference line 99 that extends generally perpendicularly outward from first leg 80*a* of connector bracket 80. Leg 80*b* of connector bracket 80 is also provided with a plurality of generally rectangularly shaped through holes 100 which are positioned along a line 101 (see FIG. 9). Line 101 also extends at an angle from a reference line 99.

Figure 13:
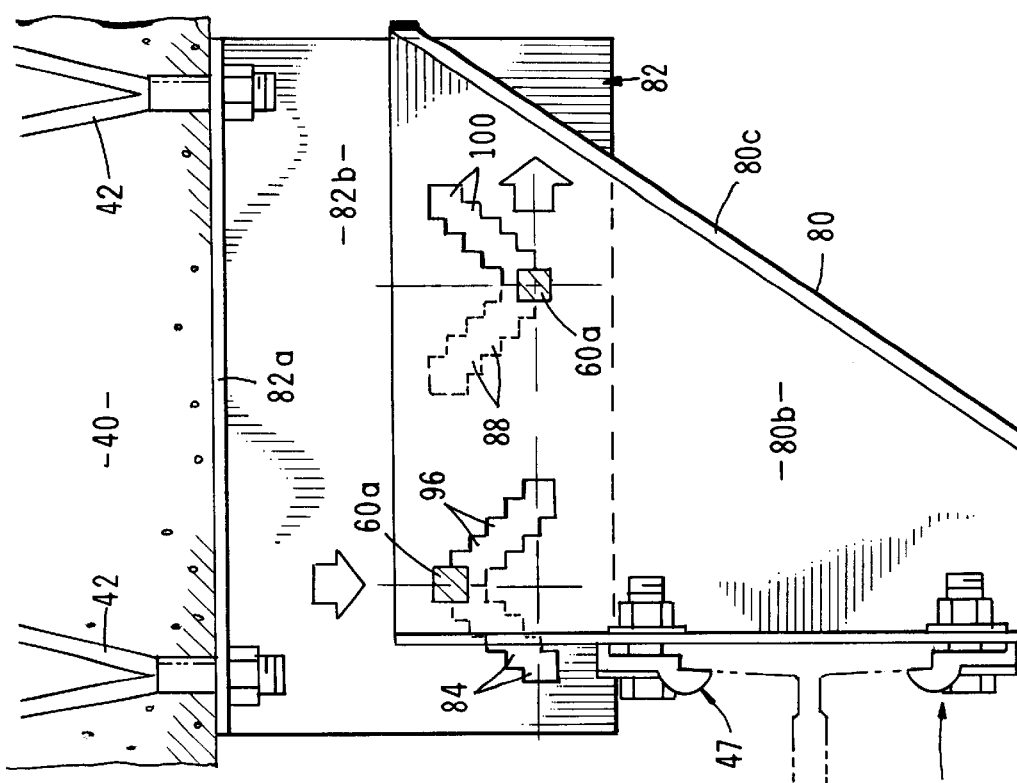
FIG. 13 is a top plan view similar to FIG. 12, but illustrating the sliding movement of the second counterweight bracket relative to the first counterweight bracket in a transverse direction to indexably align selected through holes in the brackets.
Figure 12:
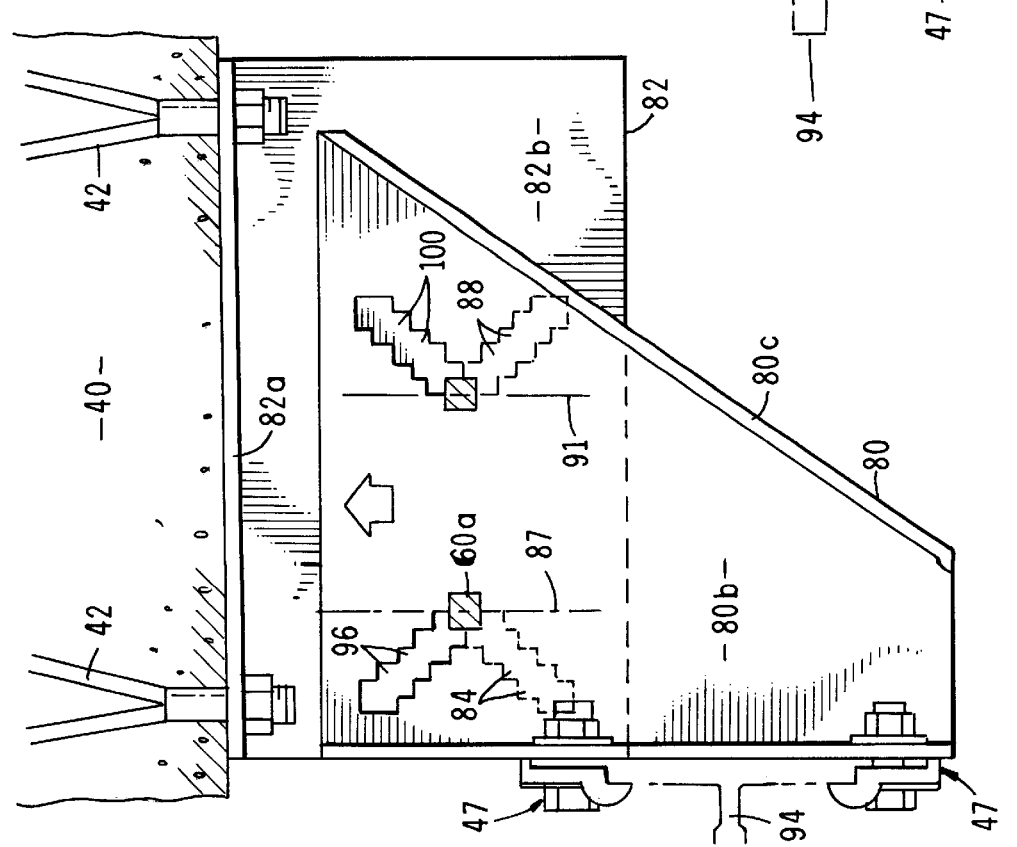
FIG. 12 is a top plan view similar to FIG. 8 illustrating the sliding movement of the second counterweight bracket relative to the first counterweight bracket in a direction toward structural wall 40 to indexably align selected through holes in the brackets.

Through holes 96 are so constructed and arranged that a selected one of the through holes 96 formed in bracket 80 can be moved into index with a selected one of the through holes 84 by a sliding movement of bracket 80 relative to bracket 82. Similarly, through holes 100 are constructed and arranged so that a selected one of the through holes 100 formed in bracket 80 can be moved into index with a selected one of the through holes 88 when the leg 80*b* of bracket 80 is moved from a first position to a second position relative to bracket 82. As was the case with brackets 50 and 62, bracket 80 can be slidably moved relative to bracket 82 in a first direction generally parallel with reference lines 87 and 91 (FIG. 12) or, alternatively, can be slidably moved in a transverse direction generally perpendicular to reference lines 87 and 91 (FIG. 13). As shown in FIG. 12, when bracket 80 is moved toward wall 40, different pairs of holes 96 and 84 and 100 and 88 will index. Similarly, as depicted in FIG. 13, when bracket 80 is moved in a transverse direction, still other pairs of holes 96 and 84 and 100 and 88 will index. Once the proper through holes have been aligned in the manner shown in FIGS. 8 and 9, bolts 60 are inserted into the aligned through holes so that rectangular shanks 60*a* of the bolts is closely received within the indexed holes. The bolts 60 are then appropriately cinched down using nuts 60*b*. After the support and connector brackets have been thusly connected, the counterweight guide rails 94 can be affixed to the brackets 80 in the manner shown in FIGS. 8 and 9 using appropriate connectors 47.

Referring next to FIGS. 19 and 20, alternate forms of similarly configured elevator support and connector brackets are there shown. In FIG. 19, elevator support and connector brackets 105 and 107 can be seen to have a lesser number of indexable through holes 109 and 111 respectively than do the earlier described brackets. Brackets 105 and 107 can be used in constructions where a minimum amount of adjustment relative to a plumb line is required. In FIG. 20, elevator support and connector brackets 113 and 115 can be seen to have an intermediate number of through holes 117 and 119 respectively. Brackets 113 and 115 can be used in instances where only a moderate degree of adjustment is required to properly position the guide rails within the hoistway.

Figure 21:
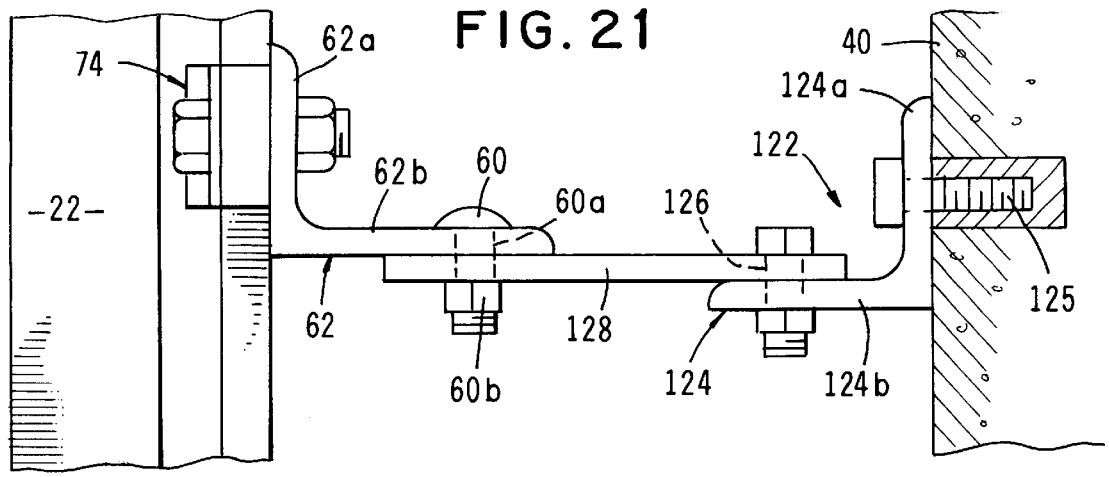
FIG. 21 is a side-elevational view illustrating the use of a spanner plate to interconnect together the support and connector brackets of the invention.
Figure 22:
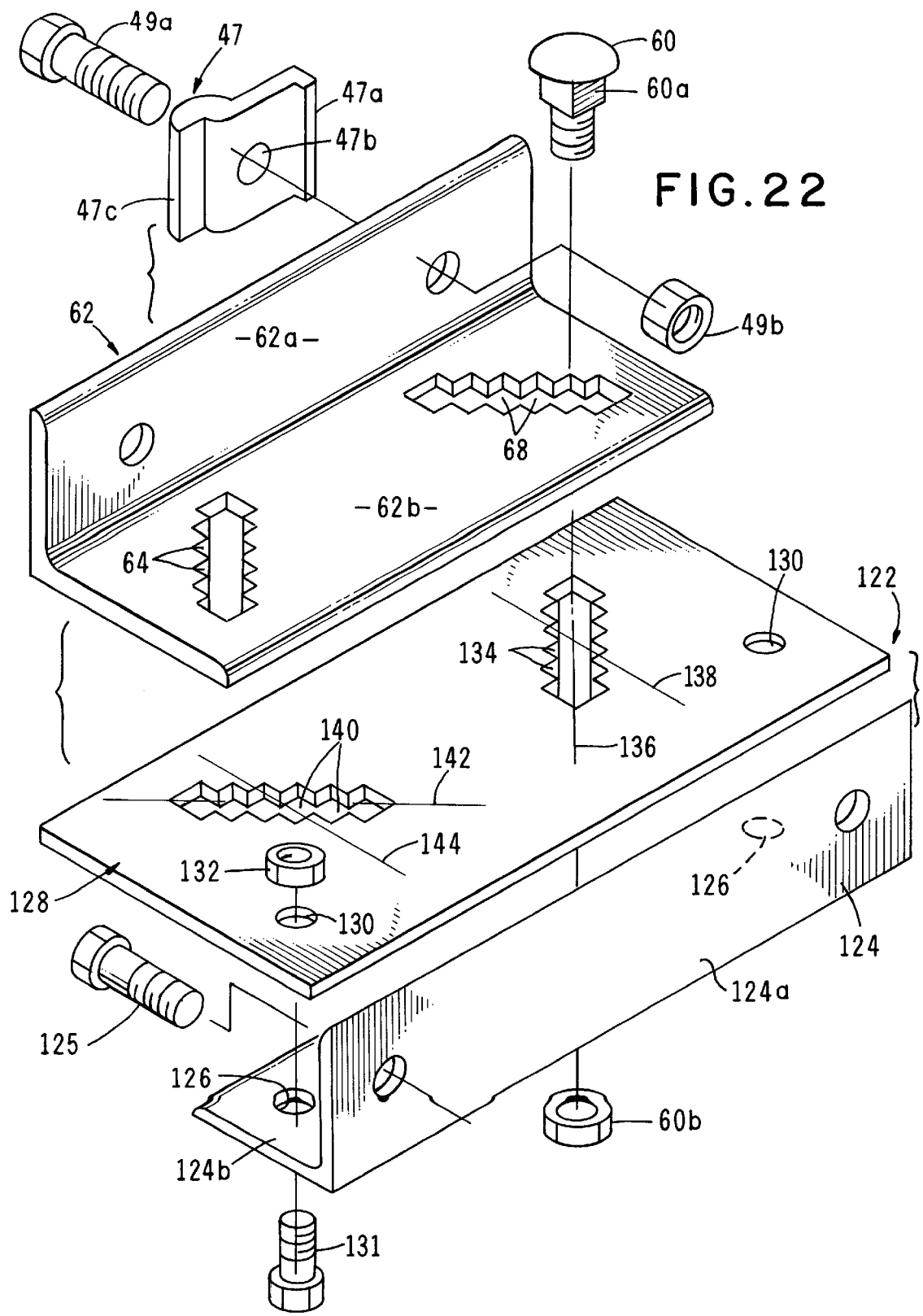
FIG. 22 is a generally perspective, exploded view of the construction shown in FIG. 21 showing the hole patterns in the support bracket, connector bracket and spanner plate.

Turning next to FIGS. 21 and 22, still another form of the connector apparatus of the invention is there illustrated. Once again this apparatus is similar in some respects to that previously described and like numbers are used in FIGS. 21 and 22 to identify like components. The primary difference between this latest form of the invention and the earlier described embodiments resides in the fact that the first bracket of the apparatus is provided in two parts. More particularly, the first bracket assembly of this latest form of the invention, which is generally designated in the drawings by the numeral 122, comprises a first right angle member 124 having a first leg 124*a* adapted to be connected to the supporting structure and a second generally planar leg 124*b* that is integrally formed with leg 124*a*. Member 124 is provided with spaced-apart bores 126 (FIG. 22), the purpose of, which will presently be described. Forming the second portion of bracket assembly 122 is a generally planar spanner plate 128. Spanner plate 128 is provided with spaced-apart bores 130, which are indexable with bores 126 formed in member 124. Plate 128 can be removably interconnected with member 124 by threaded connectors such as bolts and nuts 131 and 132 respectively. A plurality of generally rectangularly shaped through holes 134 are provided in spanner plate 128 and are positioned along a first line 136 that extends angularly with respect to a reference line 138 which extends perpendicularly from leg 124*a* of member 124. Similarly, a plurality of second generally rectangularly shaped through holes 140 are provided in plate 128 along a second line 142 that extends angularly with respect to a reference line 144.

The second bracket of this latest form of the invention is identical to earlier described second bracket and is provided with a plurality of third through holes 68 and a plurality of fourth through holes 64. After spanner plate 128 has been secured to right angle member 124 and following interconnection of angle member 124 with wall 40 using conventional connectors 125 (FIG. 21), second bracket 62 can be slidably positioned relative to spanner plate 128 in the manner previously described to align a selected one of through holes 64 with a selected one of through holes 140 and to align a selected one of through holes 68 with selected one of through holes 134 formed in plate 128. It is apparent that the use of the spanner plate 128 permits greater degrees of adjustment between the support bracket assembly 122 and the plumb line with which the second bracket 62 is to be aligned so that the guide rail can be affixed to bracket 62 in proper alignment with a plumb line in the manner previously described. When the holes in bracket 62 are properly aligned with the through holes in plate 128, bolts 60 of the character previously described can be used to interconnect bracket 62 with spanner plate 128 in the manner shown in FIG. 21.

Figure 23:
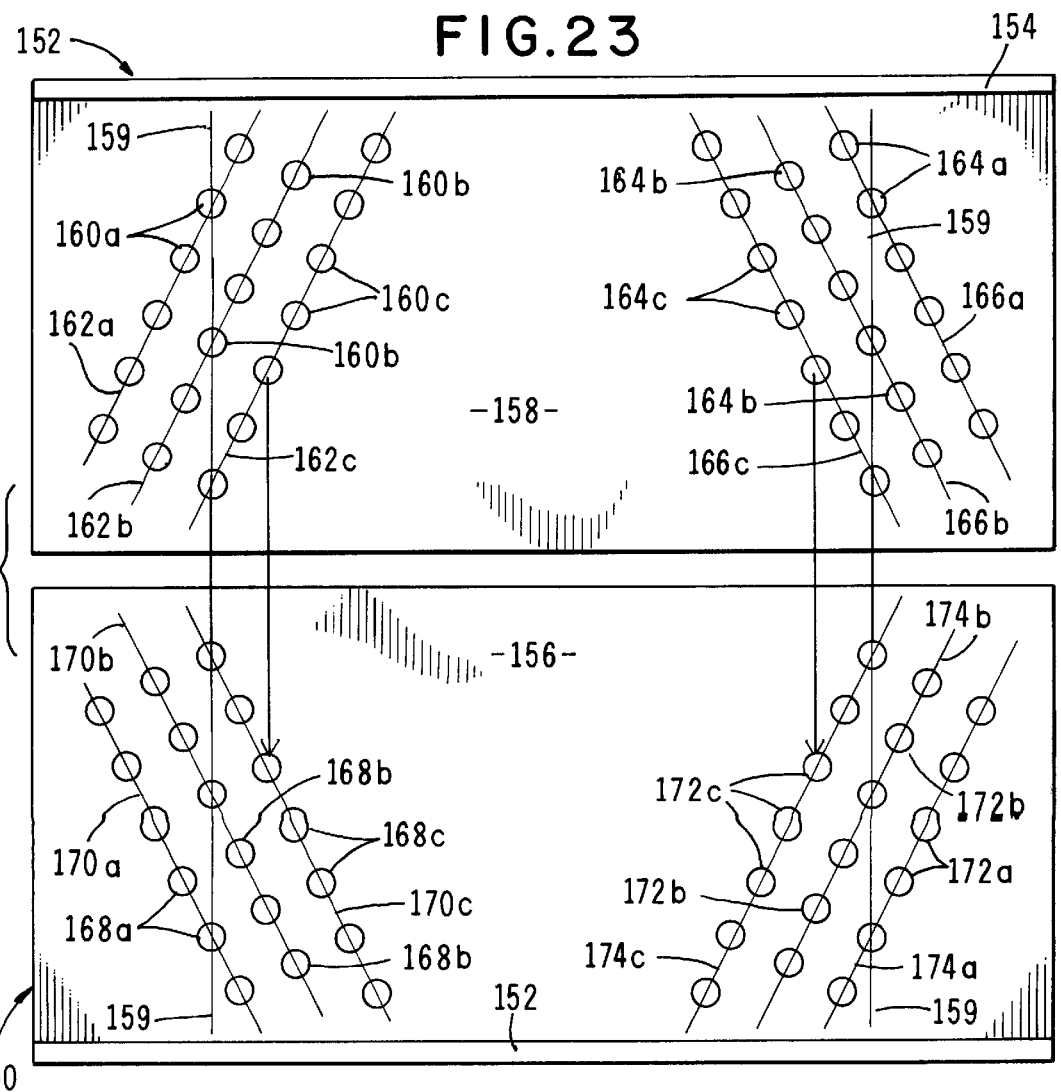
FIG. 23 is a top plan view of yet another form of support bracket and connector bracket of the invention in which a multiplicity of generally circular through holes are formed in the brackets.

Turning finally to FIG. 23, still another embodiment of the connector apparatus of the invention is there illustrated. As in the earlier forms of the invention, the apparatus here comprises a first bracket 150 having a generally planar leg 152 connected to the supporting structure by appropriate connector means. The apparatus also includes a second bracket 152 having a leg 154 that is adapted to be interconnected with a structural component such as an elevator or counterweight guide rail. Bracket 150 includes a generally planar second leg 156, while bracket 152 includes a generally planar leg 158. Bracket 152 is slidably movable relative to bracket 150 in the manner described in connection with the earlier forms of the invention to align selected through holes of a plurality of through holes provided in leg 158 with selected through holes of a plurality of through holes provided in leg 156 of first bracket 150. Unlike the through holes provided in the earlier described embodiments of the invention, the through holes provided in the brackets of this latest embodiment of the invention are generally circular in shape rather than generally rectangular in shape and are adapted to receive conventional bolts. Additionally in this latest form of the invention, a plurality of rows of generally circular-shaped holes are provided in each of the brackets 150 and 152 and extend angularly with respect to reference lines 159. More particularly, with respect to bracket 152, a plurality of first through holes 160a are positioned along an angularly extending line 162a, while a plurality of first through holes 160b are provided along a second angularly extending line 162b that is generally parallel with line 162a. Additionally, a plurality of first through holes 160c are positioned along an angularly extending line 162c which is generally parallel to lines 162a and 162b. In like manner a plurality of second through holes 164a are provided in bracket 152 along an angularly extending line 166a and a plurality of second through holes 164b are positioned along an angularly extending line 166b which line is generally parallel with line 166a. Additionally, a plurality of second through holes 164c are provided along an angularly extending line 166c which is generally parallel to lines 166a and 166b.

With respect to bracket 150, a plurality of third holes 168a are provided in bracket 156 along an angularly extending line 170a and a plurality of third through holes 168b are provided along an angularly extending line 170b. In like manner, a plurality of third holes 168c are provided along an angularly extending line 170c which line is generally parallel with lines 170a and 170b. Similarly, a plurality of fourth through holes 172a are positioned along an angularly extending line 174a and a plurality of fourth through holes 172b are provided along an angularly extending 174b. In like manner, a plurality of fourth through holes 172c are provided along an angularly extending line 174c that is generally parallel with lines 174a and 174b.

With the construction described in the preceding paragraphs, when bracket 152 is slidably moved relative to bracket 150 forwardly, rearwardly or transversely a selected one of first through holes 160a, 160b, and 160c can be moved in to index with a selected one of third through holes 168a, 168b, and 168c respectively. Similarly, sliding movement of bracket 152 relative to bracket 150 will result in the alignment of selected one of second through holes 164a, 164b and 164c with selected one of fourth through holes 172a, 172b, and 172c respectively. After the brackets have been moved into the desired location with respect to a previously established plumb line, they can be interconnected using a plurality of conventional threaded connectors such as conventional bolts and nuts.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A connector apparatus for interconnecting a structural component with a supporting structure comprising:
   (a) a first bracket having a first generally planar leg connected to the supporting structure and a second angularly extending second leg connected to said first leg, said second leg having:
      (i) a plurality of first through holes disposed along a first reference line extending at an acute angle with respect to said first leg; and
      (ii) a plurality of second through holes disposed along a second reference line extending at an acute angle with respect to said first leg; and
   (b) a second bracket connected to said first bracket, said second bracket having a first leg connected to said structural component and a second angularly extending leg slidably movable relative to said second leg of said first bracket between first and second positions, said second leg of said second bracket having:
      (i) a plurality of third through holes disposed along a first reference line extending at an acute angle with respect to said first leg of said second bracket; and
      (ii) a plurality of fourth through holes disposed along a second reference line extending at an acute angle with respect to said first leg of said second bracket one of said first through holes being indexable with a selected one of said third through holes and a selected one of said second through holes being indexable with a selected one of said fourth through holes when said second leg of said second bracket is moved from said first position to said second position.

2. The apparatus as defined in claim 1 in which the sliding movement of said second leg of said first bracket relative to said second leg of said second bracket is in a direction generally parallel to said first planar leg of said first bracket.

3. The apparatus as defined in claim 1 in which the sliding movement of said second leg of said first bracket relative to said second leg of said second bracket is in a direction generally perpendicular to said first planar leg of said first bracket.

4. The apparatus as defined in claim 1 in which said second leg of said first bracket comprises first and second interconnected portions, said second portion comprising a spanner plate, said plurality of first and second holes being formed in said spanner plate.

5. The apparatus as defined in claim 1 in which the structural component comprises a guide rail and in which the apparatus further includes rail connector means for connecting said guide rail to said second bracket.

6. The apparatus as defined in claim 1 in which each of said first, second third and fourth through holes are generally rectangular in shape and in which said apparatus further includes bolt means receivable within a selected one of said first through holes and a selected one of said third through holes, said bolt means comprising a threaded bolt having a generally rectangularly shaped shank portion closely receivable with said selected one of said first and third through holes.

7. The apparatus as defined in claim 1 in which each of said first, second third and fourth through holes are generally rectangular in shape and in which said apparatus further includes bolt means receivable within a selected one of said second through holes and a selected one of said fourth through holes, said bolt means comprising a threaded bolt having a generally rectangularly shaped shank portion closely receivable with said selected one of said second and fourth through holes.

8. A connector apparatus for interconnecting a guide rail of an elevator system with a structure defining a hoistway within which the elevator travels, said connector apparatus comprising:
(a) a first bracket having a first generally planar leg connected to the supporting structure and a second perpendicularly extending second leg connected to said first leg, said second leg having:
(i) a pair of spaced-apart first reference lines extending generally perpendicularly outward from said first leg;
(ii) a plurality of first through holes disposed along a line extending at an angle with respect to one of said pair of reference lines;
(iii) a plurality of second through holes disposed along a line extending at an angle with respect to the other of said pair of reference lines; and
(b) a second bracket connected to said first bracket, said second bracket having a first generally planar leg connected to said structural component and a second perpendicularly extending generally planar leg slidably movable relative to said second leg of said first bracket between first and second positions, said second leg of said second bracket having:
(i) a pair of spaced-apart second reference lines extending generally perpendicularly outward from said first leg to said second bracket.
(ii) a plurality of third through holes disposed along a line extending at an angle with respect to one of said second pair of reference lines of said second leg of said second bracket;
(iii) a plurality of fourth through holes disposed along a line extending at an angle with respect to said second pair of reference lines a selected two of said first through holes being indexable with a selected two of said third through holes and a selected two of said second through holes being indexable with a selected two of said fourth through holes when said second leg of said second bracket is moved from said first position to said second position; and
(c) rail connector means for connecting the guide rail of the elevator system with said second bracket.

9. The apparatus as defined in claim 8 in which said second leg of said first bracket comprises first and second portions, one of said portions having said first and second through holes formed therein.

10. The apparatus as defined in claim 8 in which each of said first, second, third and fourth through holes are generally rectangular in shape and in which said apparatus further includes a threaded bolt having a generally rectangular shank portion closely received within a selected one of said first through holes and a selected one of said third through holes.

11. The apparatus as defined in claim 8 in which each of said first, second, third and fourth through holes are generally rectangular in shape and in which said apparatus further includes a threaded bolt having a generally rectangular shank portion closely received within a selected one of said second through holes and a selected one of said fourth through holes.

12. A connector apparatus for interconnecting a guide rail of an elevator system with a structure defining a hoistway within which the elevator travels, said connector apparatus comprising:
(a) a first bracket having a first generally planar leg connected to the supporting structure and a second perpendicularly extending second leg connected to said first leg, said second leg having:
(i) a pair of spaced-apart first reference lines extending generally perpendicularly outward from said first leg;
(ii) a plurality of first through holes disposed along a line extending at an angle with respect to one of said pair of reference lines;
(iii) a plurality of second through holes disposed along a line extending at an angle with respect to the other of said pair of reference lines; and
(b) a second bracket connected to said first bracket, said second bracket having a first generally planar leg connected to said structural component and a second perpendicularly extending generally planar leg slidably movable relative to said second leg of said first bracket between first and second positions, said second leg of said second bracket comprising first and second portions, one of said first and second portions having:
(i) a pair of spaced-apart second reference lines extending generally perpendicularly outward from said first leg to said second bracket;
(ii) a plurality of third through holes disposed along a line extending at an angle with respect to one of said second pair of reference lines of said second leg of said second bracket;
(iii) a plurality of fourth through holes disposed along a line extending at an angle with respect to said second pair of reference lines a selected two of said first through holes being indexable with a selected two of said third through holes and a selected two of said second through holes being indexable with a selected two of said fourth through holes when said second leg of said second bracket is moved from said first position to said second position; and
(c) rail connector means for connecting the guide rail of the elevator system with said second bracket.

13. The apparatus as defined in claim 12 in which said first, second, third and fourth through holes are generally circular in shape.

14. The apparatus as defined in claim 12 in which said second portion of said second leg of said second bracket comprises a spanner plate.

15. The apparatus as defined in claim 12 in which each of said first, second, third and fourth through holes are generally rectangular in shape and in which said apparatus further includes a threaded bolt having a generally rectangular shank portion closely received within a selected one of said first through holes and a selected one of said third through holes.

16. The apparatus as defined in claim 12 in which each of said first, second, third and fourth through holes are generally rectangular in shape and in which said apparatus further includes a threaded bolt having a generally rectangular shank portion closely received within a selected one of said second through holes and a selected one of said forth through holes.

17. A method for interconnecting a guide rail of an elevator system with a structure defining a hoistway within which the elevator travels using a connector apparatus, a first bracket having first and second legs, the second leg having a plurality of first through holes disposed along a first line extending at an angle with respect to the second leg; and a plurality of second through holes disposed along a second line extending at an angle with respect to the second leg; and a second bracket having first and second legs, the second leg having a plurality of third through holes disposed along a first line extending at an angle with respect to the first leg of the second bracket and a plurality of fourth through holes disposed along a second line extending at an angle with respect to the first leg of the second bracket, said method comprising the steps of:

(a) connecting the first leg of the first bracket to the structure defining the hoistway;

(b) establishing the correct plumb-line location of the guide rail within the hoistway;

(c) moving the second leg of the second bracket into engagement with the second leg of the first bracket;

(d) sliding the second leg of the second bracket along the second leg of the first bracket to a position wherein the first leg of the second bracket is properly aligned with the guide rail plumb line location and in which one of the first through holes aligns with one of the third through holes and one of the second through holes aligns with one of the fourth through holes;

(e) inserting a first bolt into the aligned first and third holes; and (f) inserting a second bolt into the aligned second and fourth holes.

18. The method as defined in claim 17 in which said second leg of the second bracket comprises first and second portions, and in which said method comprises the further step of connecting together the first and second portions of the second leg of said second bracket prior to moving the second leg of the second bracket into engagement with the second leg of the first bracket.

19. A connector apparatus for interconnecting a structural component with a supporting structure comprising:

(a) a first bracket having a first generally planar leg connected to the supporting structure and a second angularly extending second leg connected to said first leg, said second leg having:
  (i) a pair of spaced apart first reference lines extending generally perpendicularly outwardly from said first leg;
  (ii) a plurality of first through holes disposed along a first line extending at an acute angle with respect to one of said first pair of said first reference lines; and
  (iii) a plurality of second through holes disposed along a second line extending at an acute angle with respect to the other of said pair of said first reference lines; and (b) a second bracket connected to said first bracket, said second bracket having a first leg connected to said structural component and a second angularly extending leg slidably movable relative to said second leg of said first bracket between first and second positions, said second leg of said second bracket having:
  (i) a pair of spaced apart second reference lines extending generally perpendicularly outwardly from said first leg;
  (ii) a plurality of third through holes disposed along a first line extending at an acute angle with respect to one of said pair of second reference lines; and
  (iii) a plurality of fourth through holes disposed along a second line extending at an acute angle with respect to the other of said second reference lines, one of said first through holes being indexable with a selected one of said third through holes and a selected one of said second through holes being indexable with a selected one of said fourth through holes when said second leg of said second bracket is moved from said first position to said second position.

* * * * *